April 5, 1960   J. R. WILKINSON   2,931,112
HYDRAULICALLY ACTUATED SCRAPER BOWL LIFTING MECHANISM
Filed March 14, 1958   3 Sheets-Sheet 3
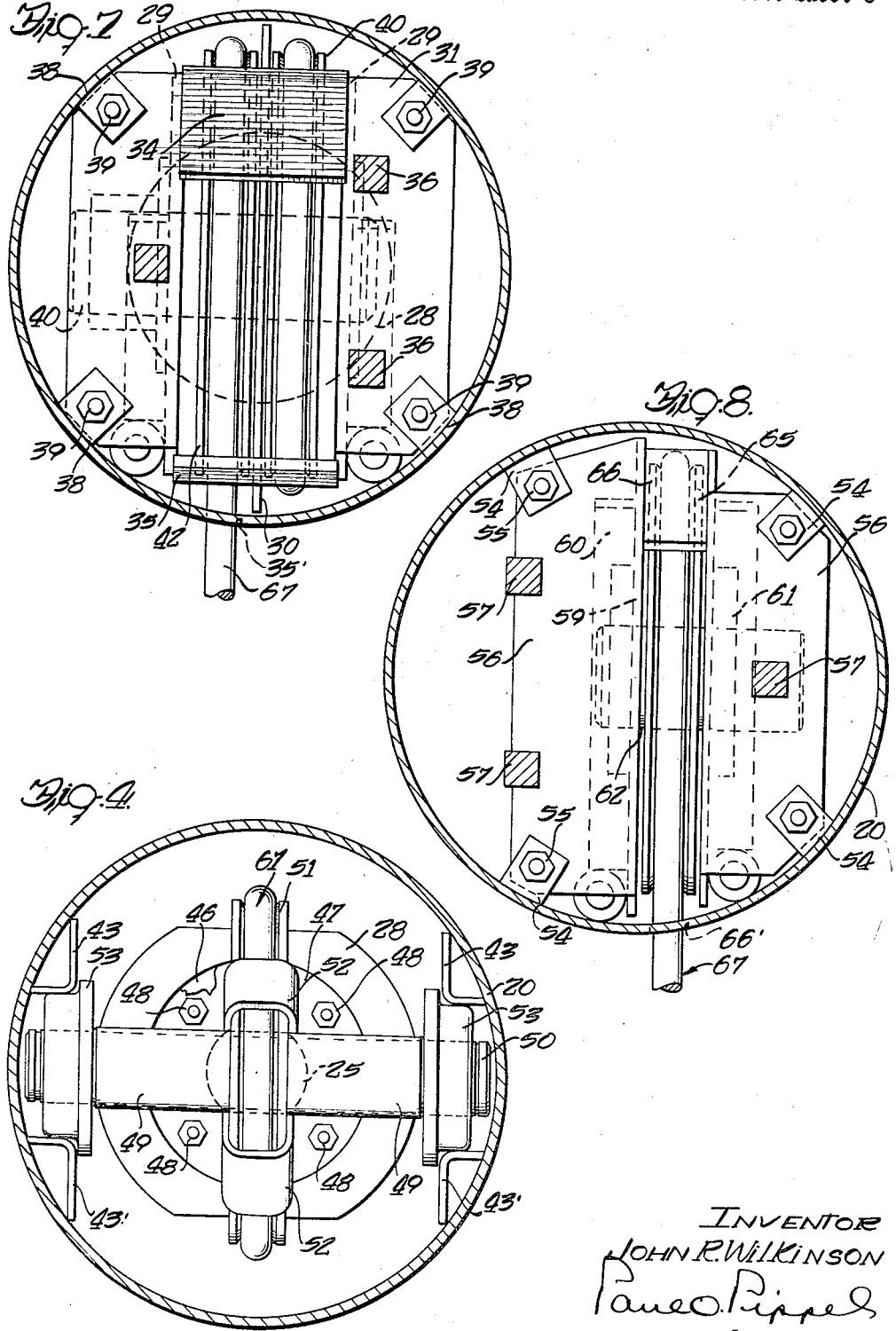
INVENTOR
JOHN R. WILKINSON
ATTORNEY 2,931,112
Patented Apr. 5, 1960

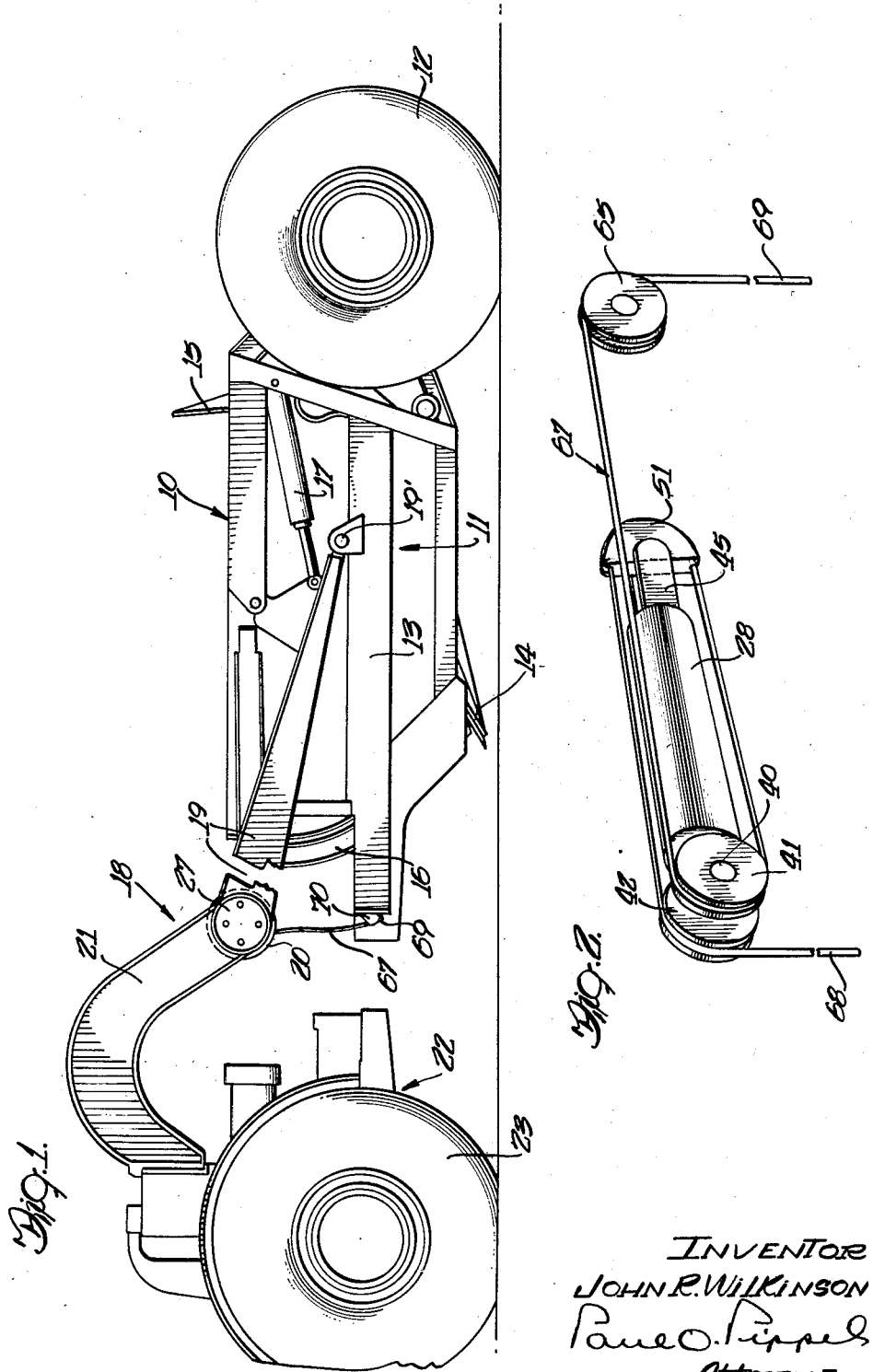

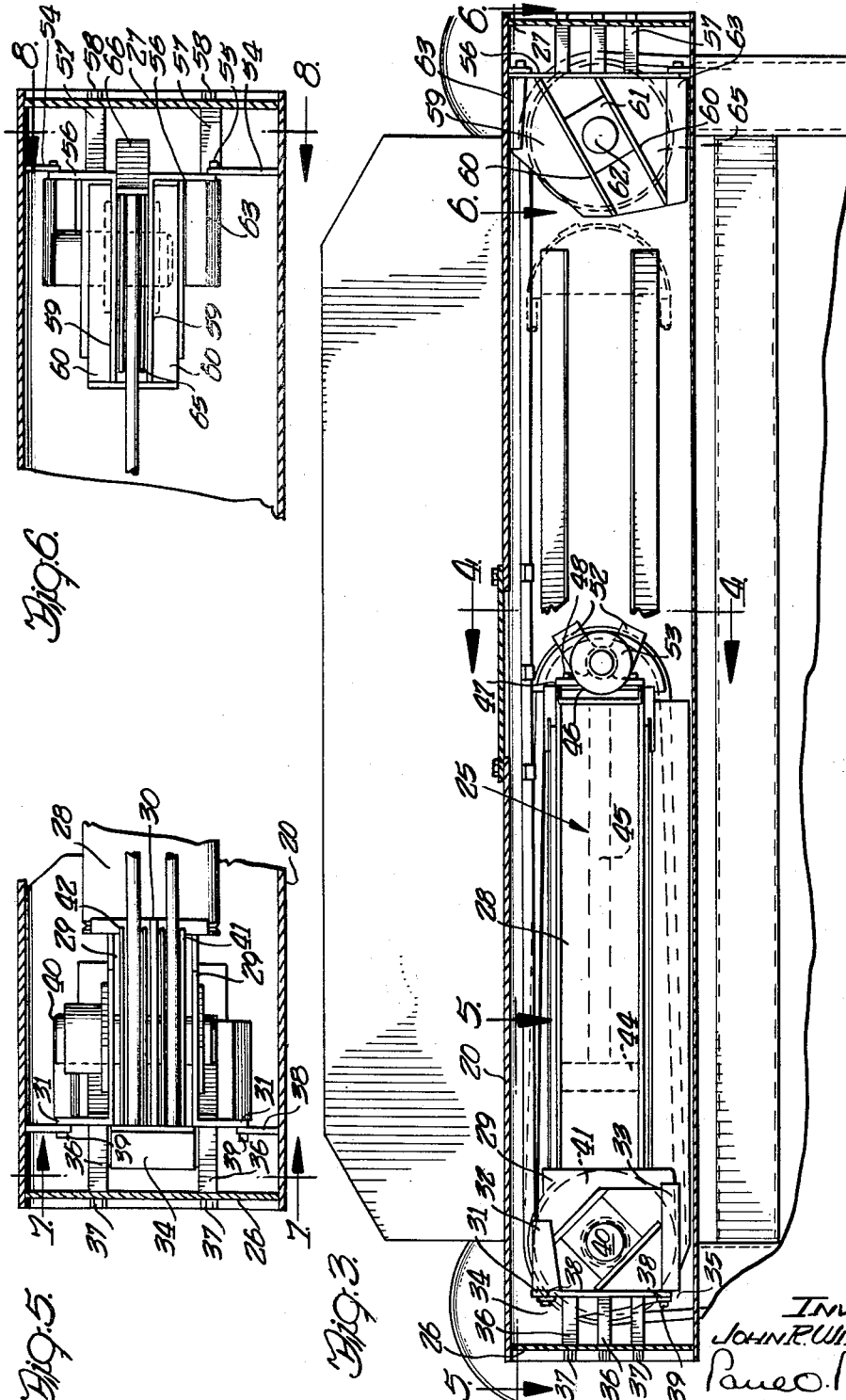

2,931,112

HYDRAULICALLY ACTUATED SCRAPER BOWL LIFTING MECHANISM

John R. Wilkinson, Mount Prospect, Ill., assignor to International Harvester Company, Chicago, Ill., a corporation of New Jersey Application March 14, 1958, Serial No. 721,400

4 Claims. (Cl. 37—126)

This invention relates to an improvement in scrapers and more particularly it relates to a hydraulically actuated lifting mechanism for raising and lowering a scraper bowl.

It is a prime object of this invention to provide an improved and simplified lifting mechanism for raising and lowering a scraper bowl with respect to the ground.

A still further object is to provide an improved hydraulic raising and lowering mechanism for scraper bowls, the said mechanism being substantially entirely enclosed within a tubular cross member forming part of a generally U-shaped draft structure pivotally connected to a scraper bowl.

A still further object is the provision of a simplified and effective raising and lowering mechanism which is positioned in an out-of-the-way relation and which has substantially all of its operating parts enclosed, thereby isolating the mechanism from dust and other debris which may be incident to the operation of a scraper.

A still further object is the provision of a greatly simplified fluid actuated raising and lowering mechanism for scraper bowls.

A still further object is the provision of a fluid operated raising and lowering mechanism which is enclosed in a portion of a U-shaped draft structure of a scraper bowl, the said actuating mechanism having an improved cable reeving arrangement.

These and other objects will become more readily apparent from a reading of the specification when examined in connection with the accompanying sheets of drawings.

Figure 1 is a side elevational view of a scraper bowl having a draft structure connected to a portion of a two-wheel tractor;

Figure 2 is a schematic perspective view of a raising and lowering mechanism for a scraper bowl;

Figure 3 is an enlarged cross sectional view through a cross beam or tubular member showing a fluid actuated raising and lowering mechanism contained within said member;

Figure 4 is an enlarged cross sectional view taken substantially along the line 4—4 of Figure 3;

Figure 5 is a fragmentary cross sectional view taken substantially along the line 5—5 of Fig. 4;

Figure 6 is an enlarged cross sectional view taken substantially along the line 6—6 of Figure 3;

Figure 7 is an enlarged cross sectional view taken substantially along the line 7—7 of Figure 5; and Figure 8 is an enlarged cross sectional view taken substantially along the line 8—8 of Figure 6.

Referring now particularly to Figure 1, a scraper bowl is generally referred to by the reference character 10. The scraper bowl 10 comprises a body 11 supported on rear ground wheels 12, only one of which is shown. A pair of side support beams 13 are connected to opposite sides of the body 11 and the forward portion of the bowl is provided with a ground engaging blade 14. The body 11 is provided with a typical ejection device 15 which is adapted to be moved forwardly for discharging a load contained within the scraper bowl 10. The bowl 10 also comprises a raisable apron 16 at the forward portion of the body 11. An apron raising and lowering mechanism is designated at 17. Thus the scraper bowl and body construction have been generally described since conventional constructions may be utilized with the present invention.

A U-shaped draft structure is indicated at 18. The U-shaped draft structure 18 includes arms 19 which are connected by means of a tubular cross beam or member 20 having connected thereto a conventional gooseneck 21. The arms 19 are pivotally connected to the side support beams 13 as indicated at 19'. The gooseneck 21 may be suitably connected to a two-wheel tractor 22 having ground wheels 23, only one of which is shown.

Referring now to the other views in the drawing, a raising and lowering mechanism is designated at 25. The raising and lowering mechanism 25 comprises essentially a pair of end closure plates 26 and 27 which are removably connected to opposite ends of the tubular member 24, substantially enclosing the said tubular member. A fluid extensible device including a fluid cylinder 28 is supported within the tubular member 20. As best shown in Figures 3 and 5, a pair of side angle brackets 29 are suitably connected to the fluid cylinder 28. A central partition plate 30 is positioned between the angle brackets 29 and is also securely connected to the fluid extensible cylinder 28. Each of the side angle brackets 29 includes a flange 31 as indicated in Figure 7. The plates 29 are also suitably stiffened by means of stiffeners 32 and 33 as best shown in Figure 3. An upper guard bracket 34 is connected to the plates 29 and 30 and likewise a lower guard bracket 35 is suitably connected to the plates 29 and 30. As shown in Figure 7, the lower end of the tubular member 20 is also provided with an opening 35'. Spacers 36 are suitably secured to the flanges 31 and are connected to the plate 26 by means of bolts 37. As best shown in Figures 3, 5 and 7, the tubular member 20 is also provided with a plurality of inwardly projecting ears 38, which by means of bolts 39 are suitably connected to the flanges 31 of the brackets 29.

A shaft 40 extends through the brackets 29 and central plate 30, the said shaft supporting for rotating movement a pair of sheaves 41 and 42 disposed on opposite sides of the central plate 30.

As best shown in Figure 4, the tubular member 20 has connected to its inner wall upper and lower track angles 43 and 43'. The track angles 43 and 43' extend longitudinally within the tubular member 20, the said angles being vertically spaced to provide a suitable track means. As shown in Figure 3, the fluid cylinder 28 is provided with a conventional type piston 44 which is adapted to reciprocate within the fluid cylinder 28 and which is connected to a piston rod or extensible member 45 which is in turn connected to a pusher plate 46. The fluid cylinder 28 is adapted to be placed in communication with a suitable pump whereby fluid under pressure can be directed to the lefthand side of the piston 44 for moving the same in a longitudinal direction. The conduits and connections for connecting the fluid cylinder to a suitable pump have not been shown since this can be of conventional construction.

The plate 46 which is connected to the piston rod 45 is in turn connected to a second plate 47 by means of bolts 48. A half sheave 51 is connected rigidly (by weld not shown) to the plate 47. A pair of tubes 49 are suitably connected to the half sheave 51 and a shaft 50 is suitably secured within the tubes 49. Upper and lower sheave guards 52 are suitably connected to the plate 47 and the tubes 49. Flanged wheels 53 are rotatably supported on the shaft 50, the said flanged wheels engaging the track members 43 and 43' as best shown in Figure 4.

Referring now to Figures 3, 6 and 8, ears 54 project inwardly within the tube 20. The ears 54 are connected by means of bolts and nuts 55 to flanges 56. A plurality of spacers 57 are suitably connected to the flanges 56, the spacers 57 extending longitudinally and being connected to the closure plate 27 by means of bolts 58. The flanges 56 are integral with vertically extending laterally spaced plates 59 which are suitably reinforced by reinforcing members 60. The reinforcing member 60 also supports laterally spaced bearing members 61 on which a shaft 62 is supported. The plates 59 further include upper and lower stiffeners 63. A sheave 65 is suitably supported on the shaft 62 and as shown in Figure 8, the plates 59 have an upper sheave guard 66 connected thereto. The tubular member 20 is also provided with an opening at its lower end designated at 66'. A cable is generally designated at 67 and as shown in Figure 2, the cable includes end portions 68 and 69.

Referring now to Figure 2 which is a schematic of the cable reeving arrangement, it is obvious that the cable 67 extends up over the sheave 42 to the half sheave 51, over the sheave and around the said half sheave 51, to the sheave 41 and over the sheave 41 to the sheave 65 and from there downwardly. The ends 68 and 69 are connected to opposite sides of the scraper support beams 13, the connection 69 which is shown including a suitable securing or cinching member, the end 68 similarly being connected.

In the operation it is of course obvious that the forward end of the scraper bowl may be raised and lowered with respect to the ground so that the cutting blade 14 is adapted to engage the ground in the lower position. The raising and lowering is accomplished by the pivotal action about the pivotal connection 19' and with respect to the arms 19. The operation possibly may be best understood by referring to the schematic Figure 2, which shows the cable reeving arrangement. Fluid is supplied through a suitable pump and conduit connection (not shown) which directs fluid to the fluid cylinder 28, whereupon the piston 44 moves the piston rod 45 and half sheave 51 toward the sheave 65. This longitudinal movement causes the ends 68 and 69 to be moved upwardly, whereupon the scraper bowl is raised. The load within the scraper can, of course, be transported and after discharge, or prior to discharge as may be desired, gravity will lower the bowl upon a release of fluid from the left-hand side of the piston 44, whereupon the piston rod 45 again will retract to the position shown in Figure 2.

Thus it is obvious that a greatly improved and simplified bowl lifting mechanism has been shown and described. The mechanism is completely enclosed within the tubular member with only the cable ends remaining without the tubular member. Thus the important moving parts of the hydraulic equipment or fluid cylinder are contained within the tubular member and are protected from the elements, and other factors encountered during operating conditions.

Thus it must be understood that the objects of the invention have been fully achieved and an improved lifting mechanism for scraper bowls has been disclosed. It must be understood that changes and modifications may be made which do not depart from the spirit of the invention as disclosed or the scope thereof as defined in the appended claims.

What is claimed is:

1. In an earth moving scraper including a scraper bowl, rear ground wheels supporting a rear portion of said bowl, said bowl having a forward ground engaging blade, a substantially U-shaped draft structure for said bowl including a pair of laterally spaced arms pivotally connected to said bowl at opposite sides thereof, a transverse tubular support connected to said arms forwardly of said bowl, and means adapted to connect said tubular support to a tractor; a raising and lowering mechanism for pivoting said bowl about the pivotal connection of said arms, comprising, a pair of laterally spaced tracks supported within said tubular member and extending longitudinally with respect to said tubular member, a fluid extensible device within said tubular member, said fluid extensible device including a fluid cylinder, supporting means connecting one end of said fluid cylinder to one end of said tubular member, first and second sheaves supported on said tubular member adjacent said supporting means, an extensible member reciprocally positioned in said fluid cylinder, a third sheave connected to said extensible member for movement therewith, track rollers pivotally connected to said extensible member, said track rollers being movably supported on said tracks, a fourth sheave rotatably connected to an opposite end of said tubular member, and a flexible member having one end connected to one side of said bowl, said flexible member extending over the first sheave, to and over the third sheave, to and over the second and fourth sheaves, the opposite end of said flexible member being connected to an opposite side of said bowl whereby during movement of said extensible member toward said fourth sheave said bowl is raised.

2. In an earth moving scraper including a scraper bowl, rear ground wheels supporting a rear portion of said bowl, said bowl having a forward ground engaging blade, a substantially U-shaped draft structure for said bowl including a pair of laterally spaced arms pivotally connected to said bowl at opposite sides thereof, a transverse tubular support connected to said arms forwardly of said bowl, and means adapted to connect said tubular support to a tractor; a raising and lowering mechanism for pivoting said bowl about the pivotal connection of said arms, comprising, track means supported within said tubular member and extending longitudinally with respect to said tubular member, a fluid extensible device within said tubular member, said fluid extensible device including a fluid cylinder, means connecting one end of said fluid cylinder to one end of said tubular member, first and second sheaves supported on said tubular member adjacent said supporting means, an extensible member reciprocally positioned in said fluid cylinder, a third sheave connected to said extensible member for movement therewith, track rollers pivotally connected to said extensible member, said track rollers being movably supported on said track means, a fourth sheave rotatably connected to an opposite end of said tubular member, and a flexible member having one end connected to one side of said bowl, said flexible member extending over the first sheave, to and over the third sheave, to and over the second and fourth sheaves, the opposite end of said flexible member being connected to an opposite side of said bowl whereby during movement of said extensible member toward said fourth sheave said bowl is raised.

3. In an earth moving scraper including a scraper bowl, rear ground wheels supporting a rear portion of said bowl, said bowl having a forward ground engaging blade, a draft structure for said bowl including a pair of laterally spaced arms pivotally connected to said bowl at opposite sides thereof, a transverse tubular support connected to said arms forwardly of said bowl, and means adapted to connect said tubular support to a tractor; a raising and lowering mechanism for pivoting said bowl about the pivotal connection of said arms, comprising, a pair of laterally spaced tracks supported within said tubular member and extending longitudinally with respect to said tubular member, a fluid extensible device within said tubular member, said fluid extensible device including a fluid cylinder, means connecting said fluid cylinder to said tubular member, first and second sheaves supported on one end of said tubular member, an extensible member reciprocally positioned in said fluid cylinder, a third sheave connected to said extensible member for movement therewith, track rollers pivotally connected to said extensible member, said track rollers being movably supported on said tracks, a fourth sheave rotatably connected to an opposite end of said tubular member, and a flexible member having one end connected to one side of said bowl, said flexible member extending over the first sheave, to and over the third sheave, to and over the second and fourth sheaves, the opposite end of said flexible member being connected to an opposite side of said bowl whereby during movement of said extensible member toward said fourth sheave said bowl is raised.

4. In an earth moving scraper including a scraper bowl, rear ground wheels supporting a rear portion of said bowl, said bowl having a forward ground engaging blade, a draft structure for said bowl including a pair of laterally spaced arms pivotally connected to said bowl at opposite sides thereof, a transverse tubular support connected to said arms forwardly of said bowl, and means adapted to connect said tubular support to a tractor; a raising and lowering mechanism for pivoting said bowl about the pivotal connection of said arms, comprising, a fluid extensible device within said tubular member, said fluid extensible device including a fluid cylinder, means connecting said fluid cylinder to said tubular member, first and second sheaves supported on said tubular member, an extensible member reciprocally positioned in said fluid cylinder and adapted to move relatively longitudinally within said tubular support, means within said tubular support for supporting and guiding said extensible member during reciprocation, a third sheave connected to said extensible member for movement therewith, a fourth sheave rotatably connected to an opposite end of said tubular member, and a flexible member having one end connected to one side of said bowl, said flexible member extending over the first sheave, to and over the third sheave, to and over the second and fourth sheaves, the opposite end of said flexible member being connected to an opposite side of said bowl whereby during movement of said extensible member toward said fourth sheave said bowl is raised.

References Cited in the file of this patent

UNITED STATES PATENTS

| | | |
|---|---|---|
| 2,204,033 | Austin | June 11, 1940 |
| 2,650,440 | Quartullo | Sept. 1, 1953 |